US011087020B2

(12) United States Patent
Malladi et al.

(10) Patent No.: US 11,087,020 B2
(45) Date of Patent: Aug. 10, 2021

(54) PROVIDING TRANSPARENCY IN PRIVATE-USER-DATA ACCESS

(71) Applicant: VMWare, Inc., Palo Alto, CA (US)

(72) Inventors: Ramana Malladi, Atlanta, GA (US); Achyut Bukkapattanam, Atlanta, GA (US); Chris Wigley, Palo Alto, CA (US); Nidhi Aggarwal, Atlanta, GA (US); Sai Kiran Vudutala, Atlanta, GA (US)

(73) Assignee: VMWare, Inc., Palo Alto, CA (US)

( * ) Notice: Subject to any disclaimer, the term of this patent is extended or adjusted under 35 U.S.C. 154(b) by 248 days.

(21) Appl. No.: 16/202,237

(22) Filed: Nov. 28, 2018

(65) Prior Publication Data

US 2020/0167500 A1 May 28, 2020

(51) Int. Cl.
*G06F 21/62* (2013.01)
*G06F 21/60* (2013.01)
*H04L 9/06* (2006.01)

(52) U.S. Cl.
CPC ........ *G06F 21/6245* (2013.01); *G06F 21/602* (2013.01); *H04L 9/0637* (2013.01); *H04L 2209/38* (2013.01)

(58) Field of Classification Search
CPC ........ G06F 21/00; G06F 21/44; G06F 21/604; G06F 21/6245; G06F 5/00; G06F 3/00; G06F 21/62; G06F 21/60; G06F 21/602; G06F 21/10; G06F 21/31; G06F 21/35; G06F 21/40; G08B 29/00; H04M 3/42; H04L 9/0637; H04L 9/06; H04L 9/3239; H04L 9/3297; H04W 12/02; G11C 16/349; G11C 16/3495
See application file for complete search history.

(56) References Cited

U.S. PATENT DOCUMENTS

| | | | | |
|---|---|---|---|---|
| 6,169,534 B1 * | 1/2001 | Raffel | G06Q 10/10 | 345/473 |
| 7,382,244 B1 * | 6/2008 | Donovan | G08B 13/19656 | 340/506 |
| 8,942,729 B2 * | 1/2015 | LeBlanc | G06Q 10/109 | 455/456.3 |
| 9,032,121 B2 * | 5/2015 | Dao | G11C 16/349 | 710/57 |
| 9,189,606 B2 * | 11/2015 | Mebed | G06F 21/62 | |

(Continued)

*Primary Examiner* — Thanhnga B Truong
(74) *Attorney, Agent, or Firm* — Clayton, McKay & Bailey PC

(57) ABSTRACT

Examples described herein include systems and methods for providing privacy information to a user of a user device. An example method can include detecting, at a management server, access of the private data by an entity other than the user, such as an administrator who is authorized to access the management server. The method further includes generating an event reflecting the access of the private data. The generated event can be stored as part of an event log in a database. The method further includes providing the event to the user device for display to the user. The event displayed on the user device can include information such as an identity of the accessing entity, a description of the private data that was accessed, and when the access occurred. The user can select a displayed event at the user device and request further information on the event from an administrator.

20 Claims, 9 Drawing Sheets

(56) References Cited

U.S. PATENT DOCUMENTS

| | | | | |
|---|---|---|---|---|
| 9,202,039 | B2 * | 12/2015 | Dandu | G06F 21/44 |
| 2013/0174211 | A1 * | 7/2013 | Aad | G06F 21/604<br>726/1 |
| 2016/0191243 | A1 * | 6/2016 | Manning | H04L 9/321<br>713/168 |

* cited by examiner

| | GLOBAL | | ADD ∨ 🔍 💬 ⭐ ❓ | | TRUDY |
|---|---|---|---|---|---|
| GETTING STARTED | DEVICES > LIST VIEW | | | | < 2/2 > RECENT LIST |
| HUB | BOBJANE IPAD IOSOPERATING SYSTEM 1... iPad Mini 4 (64 GB Space Gray) | 11.3.1 | Ownership: Employee Owned | | | QUERY | SEND | MORE ACTIONS ∨ |
| DASHBOARD LIST VIEW DETAILS VIEW | SUMMARY 550 | COMPLIANCE 551 | PROFILES 552 | APPS 553 | CONTENT 554 | LOCATION 555 | USER 556 | MORE ∨ |
| DEVICES | | | NAME | Bob Jane | |
| LIFECYCLE MANAGEMENT > | [710] | | STATUS | ⊙ ACTIVE | |
| RESOURCES > PROFILES | | | USER NAME | bobjane | |
| COMPLIANCE > POLICIES | | | EMAIL | bobjane@contoso.com  ⟵720 | |
| CERTIFICATES > | | | LOCATION GROUP | CONTOSO | |
| STAGING AND > PROVISIONING | | | EMAIL USERNAME | NOT AVAILABLE | |
| PRINTERS > | | | SECURITY TYPE | BASIC | |
| DEVICE SETTINGS ↗ | | | CONTACT NUMBER | 123-123-1234  ⟵730 | |
| | DEVICE. PLURAL | | | | |
| | LAST SEEN ∨ | FRIENDLY NAME | MANAGEMENT | CORPORATE EMPLOY... | PLATFORM | iOS | DISPLAY MODEL | ENROLLMENT | COMPLIANCE |
| | ▼ 2 DAYS AGO | BOBJANE ANDROID ANDROI... | MDM | CORPORATE DEICATE. | ANDROID 6.0.1 | SAMSUNG SM-N920T | ENROLLED | NOT AVAILABLE |
| CONFIG AND SETTINGS | | | | | | |
| ABOUT | | | | | | |

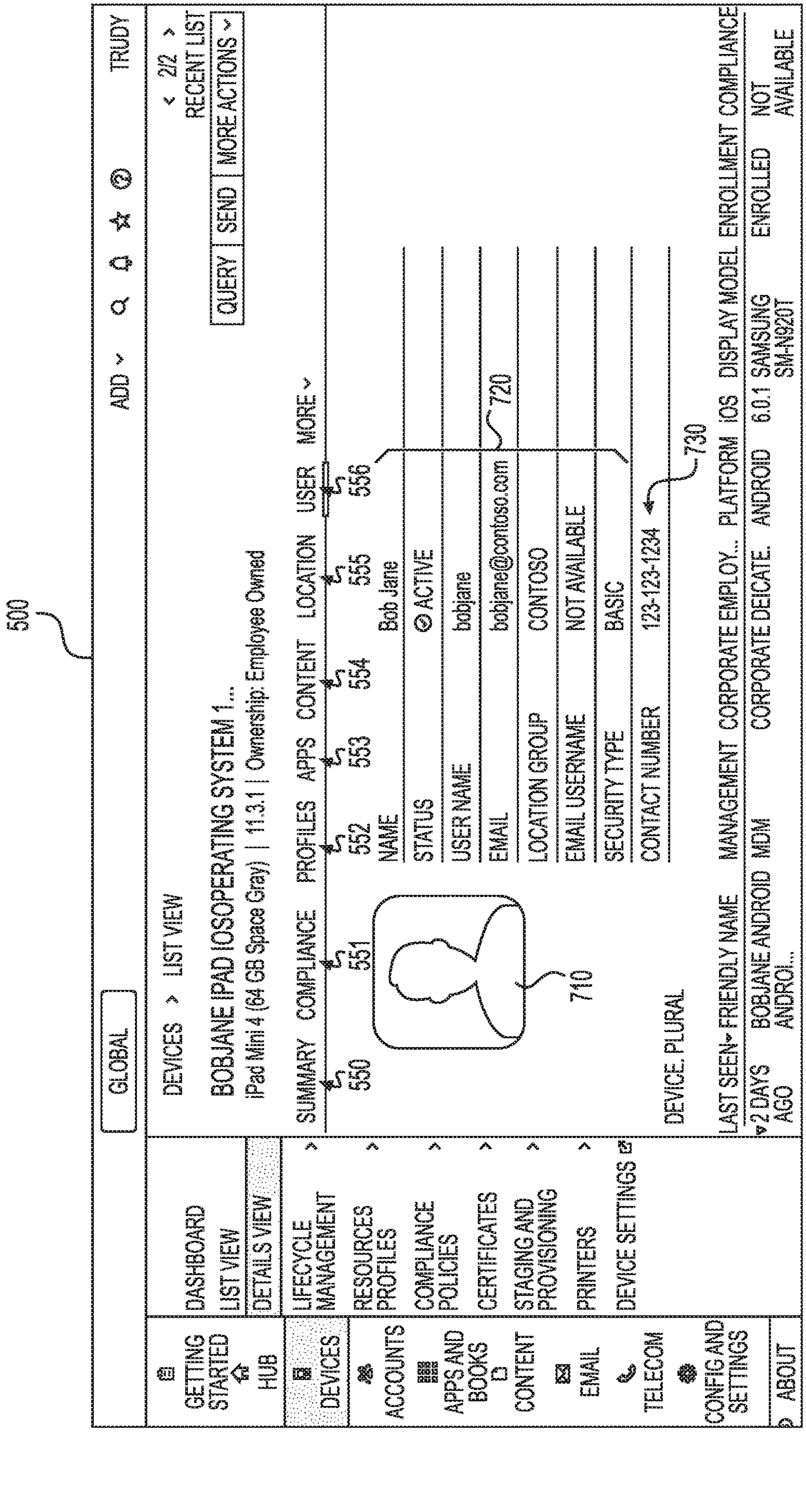

*FIG. 7*

PROVIDING TRANSPARENCY IN PRIVATE-USER-DATA ACCESS

BACKGROUND

Many corporations use a networked system of computers to perform various activities such as providing communications between employees and for exchanging various types of information and data. Some of the computers in the network are authorized for use by company officials, such as administrators and management, while others are used by workers for carrying out their employment activities. The workers can be employees of the corporation or hired contractors employed by an outside agency. The computers used by the employees or contractors can be broadly classified as either company-owned computers or worker-owned computers. Contents of a company-owned computer can include various software applications and programs that are owned and authorized for use by the company. A worker-owned computer can contain software applications and programs, such as email applications and computer aided design ("CAD") programs, that are owned and authorized by the company. They can further include private content such as photographs, personal files, and social media applications that belong to the worker and should not be accessed by company officials without permission.

In an enterprise mobility management ("EMM") system, a worker can opt to connect a worker-owned computer to the corporate network either from a remote location or from inside company premises, using the worker-owned computer to access company-owned software applications and programs. In this situation, the employer typically monitors various activities carried out by the worker upon their computer. The monitoring can be carried out for example to ensure that the company-owned software applications and programs contained in the computer are not being misused by the worker.

In some cases, the employer is also permitted to monitor certain types of activities carried out by the worker using the worker-owned computer. One example of such activity is the use of an unauthorized program on the worker-owned computer that may compromise the security of other computers connected to the corporate network. However, in allowing such monitoring, the worker may want to ensure the employer does not access certain information or actions that are private and unrelated to the employer's business.

Consequently, a need exists for providing systems and methods that allow a computer user such as the worker described above, to be granted transparency to various actions that are carried out by the employer upon the worker's private data.

SUMMARY

Examples described herein include systems and methods for providing privacy information to a user of a user device. An example method includes detecting, at a management server, access of the private data by an entity other than the user. One example of such an entity is an administrator who is authorized to access the management server. Another example of such an entity is an intruder who accesses the management server with malicious intent. The entity could also be a third party that receives the private data or intercepts the private data as it is being transmitted elsewhere. The method further includes generating, at the management server, an event reflecting the access of the private data by the entity other than the user. The generated event is stored as part of an event log in a database that is accessible to the management server. The method further includes providing the event to the user device for display to the user. The action can be taken in response to a request or inquiry sent from the user device to the management server. The event details displayed on the user device can include information such as an identity of the accessing entity, a description of the private data that was accessed, and when the access occurred.

Storing of the event log in the database can also include the use of a hash and a blockchain application for storing the hash. The blockchain application ensures immutability to the stored data and can be used to perform an audit for verifying an authenticity of the event log or for detecting tampering of the event log. The audit can be carried out by comparing the event log to the data stored by the blockchain application, such as by comparing a hash of an event in the event log to a hash of the data stored by the blockchain application for that event log. Remedial action can be taken when the comparison indicates a discrepancy. The user can be notified of various actions carried out at the management server, such as the execution of an audit and details pertaining to a failed audit.

The examples summarized above can be incorporated into a non-transitory, computer-readable medium having instructions that, when executed by a processor associated with a computing device, cause the processor to perform the actions described. Additionally, the example methods summarized above can each be implemented in a system including, for example, a management server, an event log storage element, a console for an administrator to access the management server, and a user device.

Both the foregoing general description and the following detailed description are exemplary and explanatory only and are not restrictive of the examples, as claimed.

BRIEF DESCRIPTION OF THE DRAWINGS

FIG. 7 is an illustration of an example GUI displayed on the console

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. For example, words such as "message," "information," "content," and "data" can be used interchangeably to convey the same meaning in the context of the matter described in this disclosure.

Examples described herein include systems and methods for providing privacy information to a user of a user device. An example method can include detecting, at a management server, access of the private data by an entity other than the user, such as an administrator who is authorized to access the management server. The method further includes generating an event reflecting the access of the private data. The generated event can be stored as part of an event log in a database. The method further includes providing the event to the user device for display to the user. The event displayed on the user device can include information such as an identity of the accessing entity, a description of the private data that was accessed, and when the access occurred. The user can select a displayed event at the user device and request further information on the event from an administrator.

Figure 1:
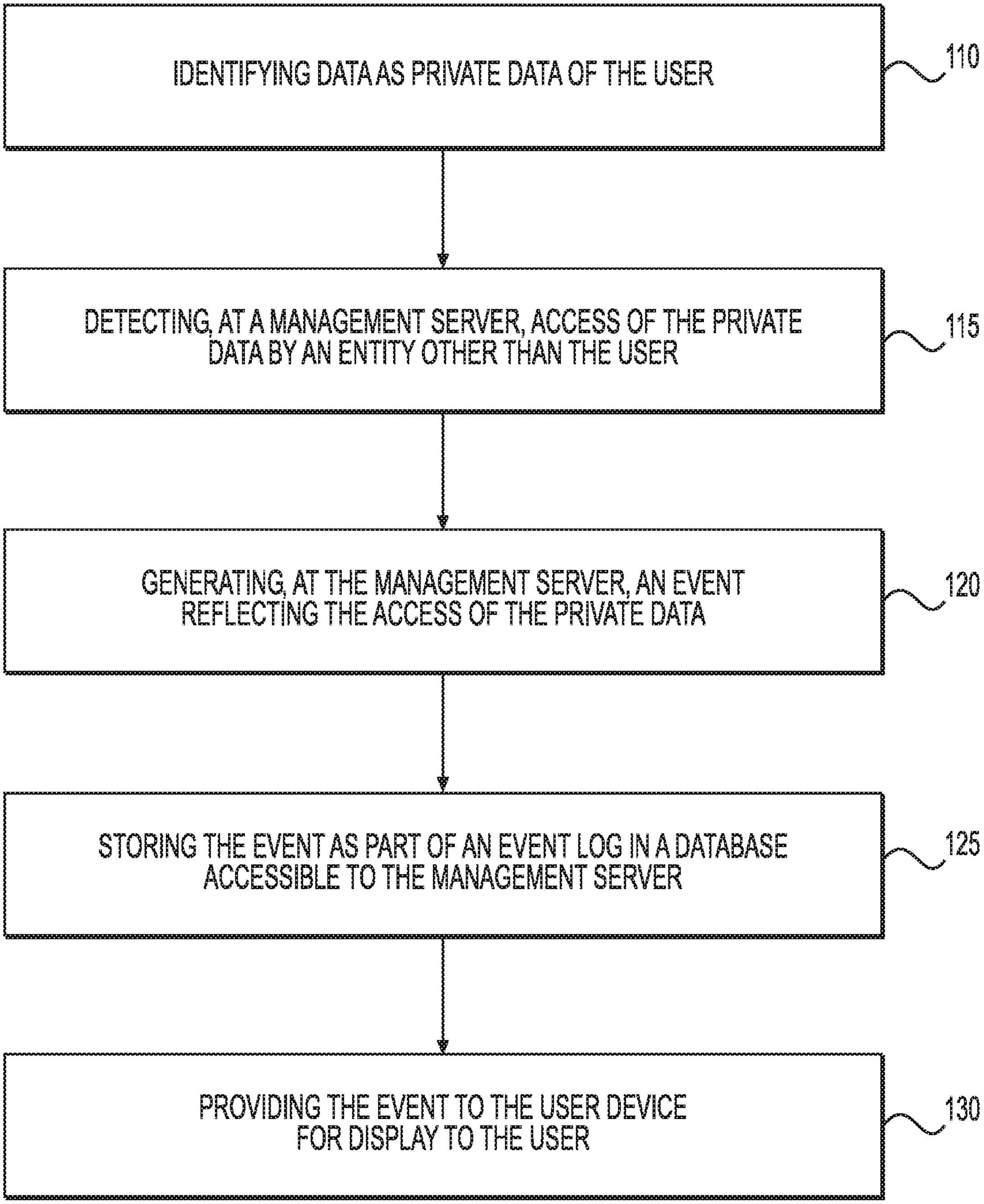
FIG. 1 is a flowchart of an example method for providing privacy information to a user of a user device.

FIG. 1 is a flowchart of an example method for providing privacy information to a user of a user device. A user device can be any type of computing device and can include, for example, a hardware processor and a memory store. The processor can execute non-transitory instructions stored in the memory store. The user device can also include various hardware accessories such as a camera, microphone, speaker, accelerometer, gyroscope, GPS transmitter, wireless-internet transmitter, NFC transmitter, or other hardware. The user device can execute an operating system that manages system resources and other software installed on the device. The user device can also execute software applications. Common examples of a user device include, but are not limited to, mobile telephones, computers, laptops, tablets, or watches. A user device can be managed by a management server. The user device can be enrolled with the management server, turning over control of certain functionality to the management server. The management server can implement that control over the user device in a variety of ways, such as by allowing a system administrator to access information regarding the state of the user device.

Stage 110 can include identifying data as private data of the user. This action can be carried out in various ways. In one example, a user of a user device can provide to an administrator a list of various items contained in the user device that are private to the user. In another example, one or more types of data can be designated as including, or potentially including, private data. For example, data types including phone numbers, email addresses, home addresses, financial compensation, and non-enterprise applications or data can be designated as private. Any data stored within an EMM system, such as at a management server of the system, that falls within these designated data types can be considered private. In some examples, data can be presumed to be private unless the data belongs to a category of non-private data, such as enterprise data. In that example, any data not considered enterprise data could be considered private. This could include, for example, the non-enterprise applications installed on a user device. The identification of data at stage 110 can be performed automatically by the system based on predetermined data classifications. In some examples, identifying data as private also includes associating a hook or trigger with the data. Accessing the data can therefore include accessing the hook or trigger, which can be used to perform further actions.

Stage 115 can include detecting, at the management server, access of the private data by an entity other than the user. The detection can occur at the management server or at a console associated with the management server. The console can provide an interactive GUI allowing an administrator to interact with the management server, such as by establishing or changing settings at the management server. Detection can further include detecting that a hook associated with a particular data field has been accessed. For example, an administrator can select a "user" tab within the console that displays information about the user, such as their name, address, and phone number. In one example, the "user" tab can be associated with a hook. In that example, when the "user" tab is accessed, the hook causes an additional action or notification to be generated.

In other examples, a third party can access or request private data from the management server. The third party can, for example, call an Application Programming Interface ("API") associated with the management server to request the private data. The API call can request, for example, the phone number of a particular user. The API call can come from an authorized third-party provider or an unauthorized party; both requests would trigger one or more hooks associated with the private data. In one example, a hook is associated with a particular API call (such as an API call requesting a phone number or home address). In another example, the hook is associated with a data file that is considered private. In that example, when the data file is accessed, requested, or transmitted, the hook can be triggered.

In some examples, the management server can compare the person accessing the data to the person to which the data belongs. For example, the hook can cause code to execute that gathers the entity accessing the data as well as the entity to which the data corresponds. If those entities, match, the management server can disregard the access. If the entities do not match, however, the management server can consider the access to be performed by an entity other than the user.

In another example, applications on the user device can detect the private data access and report it to the management server. For example, the applications can implement a software development kit ("SDK") that detects when data within an application is accessed. For example, a call to access data from the application can cause the SDK to report to the management server that the data was accessed, along with who accessed the data and when.

Stage 120 can include generating, at the management server, an event reflecting the access of the private data. For example, the management server can extract information regarding the access event, such as the time of access, the entity requesting access, the particular data triggering the detection at stage 115, and any other relevant information. This information can be stored in a file that is considered the "event." The event file can have a standardized format, such as a table that includes fields for pertinent information about the information access such as the date of access, time of access, type of information accessed, the user to which the information belongs, and the entity accessing the information.

Stage 125 can include storing the event as part of an event log in a database accessible to the management server. The event log can be a collection of event files, in one example, or a single file that includes the contents of multiple event files. In some examples, an event log is specific to a particular user, user device, or enterprise. For example, the event log can include a table for all events occurring with respect to a particular user. The table can be filled in with information from each event file relevant to the user. In some examples, the table in the event log is updated automatically based on a new event file being generated at stage 120.

Stage 130 can include providing the event to the user device for display to the user. In one example, the event file is provided to the user device in response to a request made by the user or the user device. For example, the user device can request all available event files in response to launching or updating an application, executing on the device, that utilizes the event files. An example of such an application is a privacy application that displays a feed of all events relating to access of the user's private information. While an event can be provided to the device by transmitting an event file individually, it can also be provided by transmitting an event log that is specific to the user of the requesting user device. In another example, the event or the event log is provided to the user device on a periodic basis.

The user device can include a privacy application for displaying privacy information to a user, such as instances of accesses of the user's private data. The privacy application can be a standalone application or part of another application, such as a management agent. The privacy application can include privileges that allow it to communicate with the management server to receive events regarding access of the user's private data, and in some examples to send requests to the management server. The privacy application can be a software application that is downloadable by the user from the management server or obtainable from other approved sources. The privacy application includes a user interface that can be used by the user for carrying out various operations such as transmitting messages to the management server or administrator, obtaining a response from the management server, and displaying information such as the event log.

Figure 2:
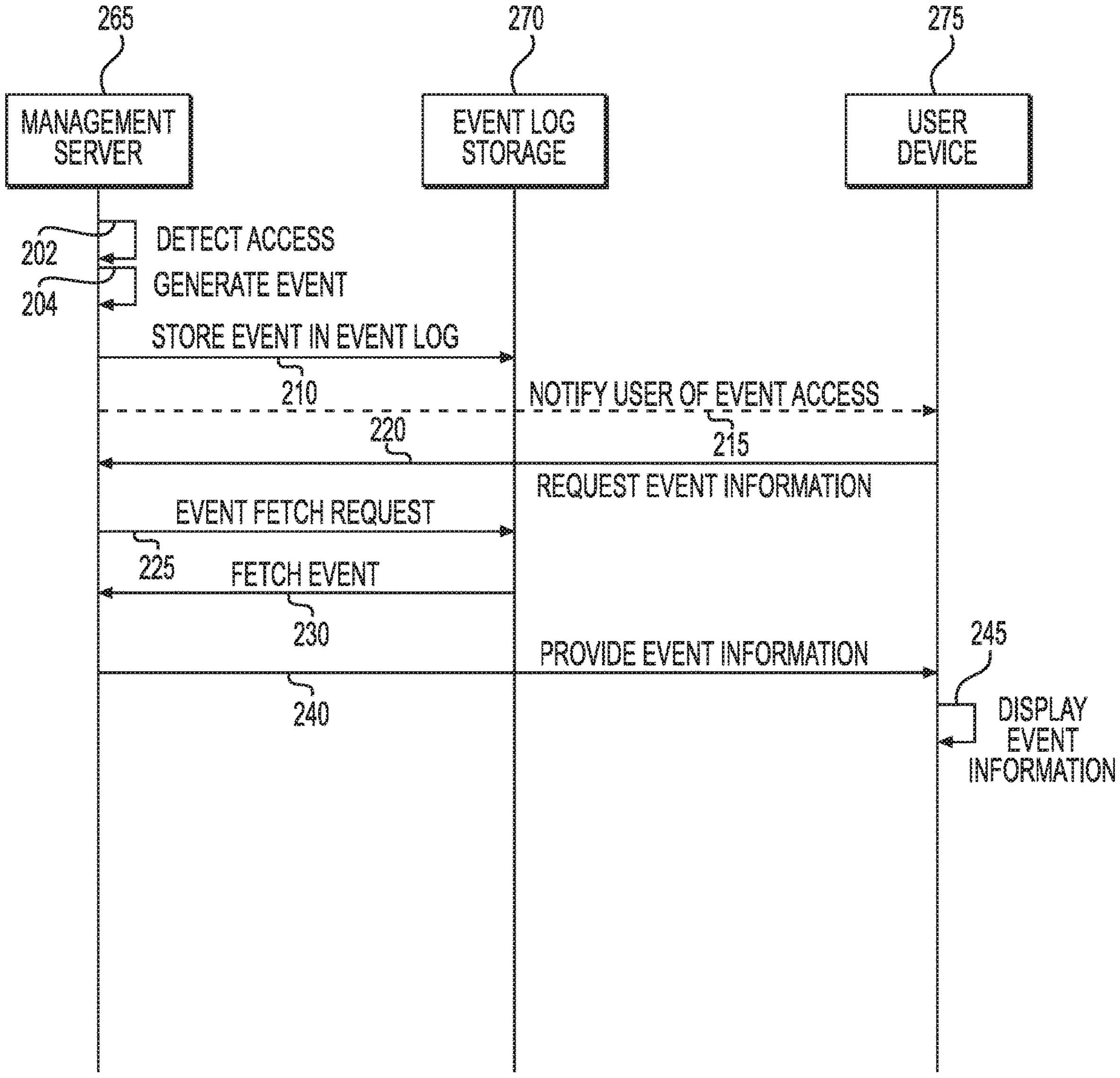
FIG. 2 is a sequence diagram of an example method for providing privacy information to a user of a user device.

FIG. 2 is a sequence diagram of an example method for providing privacy information to a user of a user device. At stage 202, the management server 265 detects access of private user data. The detection at stage 202 can be based on any event that includes access to, or transmission of, a user's private data. For example, the detection can be based on an administrator accessing a user's private data through a console associated with the management server 265. Accessing the private data can trigger a hook associated with the data or otherwise trigger an action. For example, an administrator can select a "user" tab within the console that displays information about the user, such as their name, address, and phone number. In one example, the "user" tab can be associated with a hook. In that example, when the "user" tab is accessed, the hook causes an additional action or notification to be generated.

In another example, the detection can be based on a third party accessing or requesting the user's private data. For example, the third party can make an API call to the management server 265 requesting the private data, such as by requesting the user's phone number, address, or a listing of applications installed on the user's device. The API call can come from an authorized third-party provider or an unauthorized party; both requests would trigger one or more hooks associated with the private data. In one example, a hook is associated with a particular API call (such as an API call requesting a phone number or home address). In another example, the hook is associated with a data file that is considered private. In that example, when the data file is accessed, requested, or transmitted, the hook can be triggered.

At stage 204, the management server 265 can generate an event based on the access detected at stage 202. For example, the management server 265 can extract information regarding the access event, such as the time of access, the entity requesting access, the particular data triggering the detection at stage 202, and any other relevant information. This information can be stored in a file that is considered the "event." The event file can have a standardized format, such as a table that includes fields for pertinent information about the information access such as the date of access, time of access, type of information accessed, the user to which the information belongs, and the entity accessing the information. The event generated at stage 204 can be stored in a storage location accessible to the management server 265, such as an event log storage 270, at stage 210. The event log storage 270 can be part of the management server 265 or it can be a remote storage location.

Stage 215 indicates an optional step where the management server 265 can send a notification, or cause a notification to be sent, to the user device 275, alerting the user of an access event. The notification can be displayed at the user device 275 as a notification associated with the privacy application installed on the user device 275. In some examples, the notification at stage 215 can be provided for each access event detected at stage 202. In other examples, the notification at stage 215 can be provided only for certain types of detected access. For instance, a notification can be sent when an administrator accesses a user's phone number or home address, but not when the administrator accesses a listing of applications installed on the user's device 275, even if both types of access are detected at stage 202. Similarly, a notification can be sent for unauthorized third-party access, but not for authorized third-party access.

At stage 220, the user device 275 requests event information from the management server 265. The request at stage 220 can be performed by the privacy application executing on the user device 275. The privacy application can request event information upon being launched or when the application transitions from the background to the foreground of the operating system of the user device 275. The privacy application can also include a refresh feature within the application, such as a graphical element or a gesture that can cause the refresh to occur, which causes the application to request updated event information. In some example, the privacy application can request periodic updates at stage 220.

At stage 225, the management server 265 can send a fetch request to the event log storage 270 for fetching information pertaining to the request made by the user device 275 at stage 220. At stage 230, the event log storage 270 provides the event information to the management server 265. The management server 265 can then provide the event information to the user device 275 at stage 240. At stage 245, the user device 275 can display the event information.

In some examples, the request for event information at stage 220 can be provided to an entity other than the management server 265. For example, the request can be made to a verification server that stores event information and confirms its veracity before providing it to the user device. In that example, stages 225, 230, and 240 can be performed by the verification server rather than the management server 265. The verification process can be useful in instances where an administrator has access to a user's private data and also has the ability to alter or delete records associated with that access. In theory, an administrator could access a user's private data and then, knowing that the management server can detect and store a record of such access, access the event log storage 270 to delete or alter the event log. In that example, the administrator's potentially unwelcomed access would avoid being reported to the user. The description of the system shown in FIG. 3 provides more detail regarding the verification process.

Figure 3:
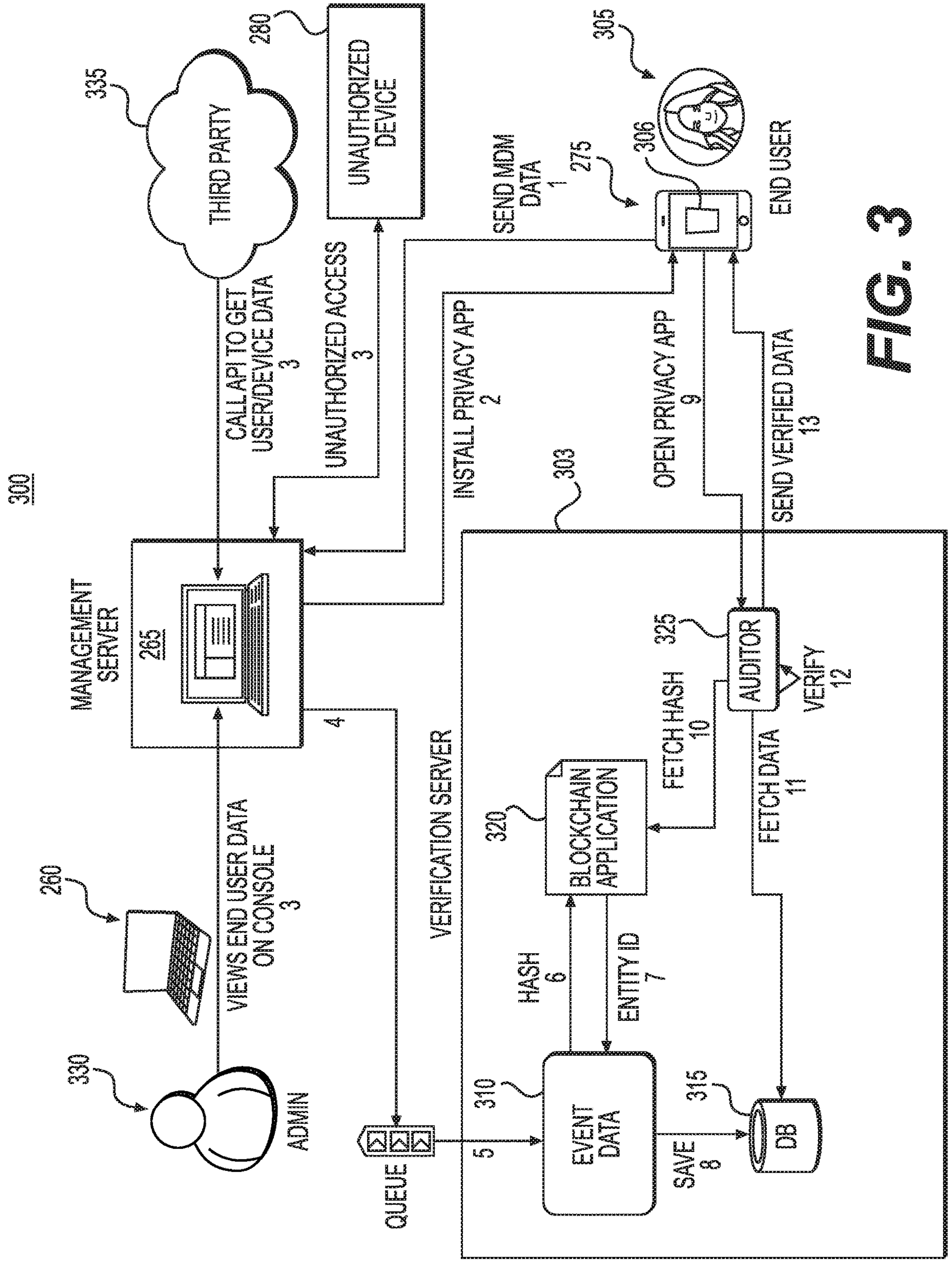
FIG. 3 is an example illustration of certain operations that can be carried out upon a system that provides privacy information to a user of a user device.

FIG. 3 is an example system 300 that can perform the various methods described herein. The system 300 can include at least the console 260, the management server 265, the user device 275, and a verification server 303. Though shown as single blocks or entities, the elements and components shown in FIG. 3 can be implemented using multiple elements and configurations. For example, the management server 265 can be implemented in the form of a network of multiple computers or servers that are communicatively coupled to each other and to the user device 275 via a network (not shown). As another example, the verification server 303 can be implemented in the form of one or more of: a number of computational devices interconnected with each other, a number of storage elements (including cloud storage), a distributed architecture, and various types of software and technologies such as used for a blockchain application. Some example operations associated with the various elements of system 300 are described below.

In one example, a user device 275 associated with a user 305 sends management-related data to the management server 265. The management-related data can include an enrollment request, if the device 275 is not yet enrolled with the management server 265. The management-related data can also include status information regarding the user device 275, such as a device identifier, serial number, device type, operating system type and version, list of installed applications, geographic location, and any other information pertaining to the device 275. The management-related data can also include user 305 information, such as the user's 305 email address, home address, employer, organizational group, phone number, social security number, and taxpayer ID. The action of sending the enrollment request or the management-related data is indicated as Action 1.

The process of enrollment can include various back-and-forth communications between the management server 265 and the user device 275. The process can include, for example, providing a privacy application 306 to the user device 275 as shown by Action 2 in FIG. 3. The management server 265 can provision the privacy application 306 directly to the user device 275 or it can instruct the user device 275 to download the privacy application 306 from an authorized provider or location. In one example, the privacy application 306 can be downloaded as an unmanaged application prior to enrollment. This can allow the user to set which types of data can be accessed prior to enrollment. During enrollment, these selections can be used to speed up or configure the enrollment process.

Action 3 can include access of a user's 305 private data that is detected by the management server 265. As shown in FIG. 3, the detected access can come from a variety of sources. For example, an administrator 330 can use the console 260 to interact with information stored by the management server 265 and access private data, such as by selecting an option within the console 260 that displays a user's 305 phone number or social security number. Action 3 can also involve a third-party 335 interacting with the management server 265 to access various types of data. The third-party can make an API call to the management server 265 requesting information, including private information of the user 305. The third-party 335 can be an authorized entity permitted to interact with the management server 265 for various purposes such as to provide services related to manufacturing, sales, or operations. Providing of such services can also involve fetching data that can be provided by the management server 265 to the user 305. The third-party partner 335 can also be an authorized entity that provides or supports applications for the user device 275. Action 3 can further involve an unauthorized entity that uses an unauthorized device 280 to access the management server 265 to obtain the user's 305 private data.

When the data access performed by one or more entities associated with Action 3, above, is detected by the management server 265 as pertaining to private data, the management server 265 can generate an event and provide it to the verification server 303 using queue service (Actions 4 and 5). The event information provided from the queue to the verification server 303 (Action 5) can be temporarily stored in a buffer element that is illustrated in FIG. 3 as event log data 310. The event log data 310 can include for example, one or more items such as: a listing of one or more private applications or types of private data that were accessed, the entity accessing the private applications or data, a name or identification of the administrator 330, third party 335, or unauthorized device that carried out the access, a date and time at which the access was performed, an identification of the user 305 to whom the private data pertains, and a reason for the access, if any.

The event log data 310 can be hashed by utilizing a hash function that maps the data of the event log data 310 to fixed data size. The resulting hash can be forwarded to a blockchain application 320, together with additional information such as the identity of the administrator and the action carried out by the administrator. This operation is indicated as Action 6. The blockchain application 320, which can include a number of computer nodes, converts the information into a blockchain format and stores the information in the blockchain format. The various computer nodes can contribute various parts of the blockchain, such as a time stamp and a label, that are combined with the information in the hash format. Storing the information as a hash in a blockchain format ensures immutability to the information and can be used to detect tampering as described below in more detail. The blockchain application 320 then returns an entity ID label that is associated with the information stored in the blockchain application 320. This operation is indicated as Action 7.

The event log data 310 can separately be stored in a database 315 that is part of, or accessible to, the verification server 303. The event log data 310 can be stored in its original form or it can be stored as a hashed value (the same hashed value provided to the blockchain application 320). The entity ID provided by the blockchain application 320 can also be saved in the database 315. These operations are indicated as Action 8. The database can include an event log that includes, for example, a table storing a list of user names, a description of the data associated with each name, and the entity ID label provided by the blockchain application 320.

When the user launches or refreshes the privacy application 306, the privacy application 306 requests event information from the verification server 303 as shown by Action 9. While in some examples the event information can be provided directly to the privacy application 306, the system of FIG. 3 includes a verification mechanism within the verification server 303. For example, an auditor module 325 can receive the request of Action 9. The auditor module 325 can fetch data pertaining to the one or more access events from the blockchain application 320 (Action 10) and corresponding data from the database 315 (Action 11).

The auditor module 325 can carry out an audit operation (Action 12) in order to verify the integrity of the data stored in the blockchain application 320 and the database 315. For example, the auditor module 325 can hash the event log data 310 stored in the database 315 and compare the resulting hash to the hash stored in the blockchain application 320 that corresponds to the appropriate entity ID. If the data stored in the database 315 is the same as the original event data log 310 that was stored in the blockchain application 320, the two hashed values should provide an exact match. If, on the other hand, the data stored in the database 315 has been altered in any way, the hashes will not match.

Upon successfully verifying that the hashes match, the auditor module 325 can send the verified data to the privacy application 306, as shown by Action 13. The user 305 can then use the privacy application in the user device 275 to examine the data and obtain various types of information such as who accessed the data, when the access was carried out, and the nature of the data that was accessed. The user can then carry out various actions such as sending a message to the administrator 330 to inform the administrator 330 that some of the data that was accessed is private data, to inquire about why the data was accessed, to request an investigation of an access that was made, and to classify some types of data as private data and prohibit access of this private data going forward.

If the auditor module 325 determines that the hashes do not match, and that the data in the database 315 has therefore been tampered with, the verification server 303 can take various actions. In one example, an alert message is sent out to personnel such as the administrator 330 or a supervisor of the administrator 330. The alerted personnel can then use the data stored in the blockchain application 320 to carry out an investigation. The investigation can be directed at determining one or more details pertaining to the tampered event. For example, the investigation can be directed at identifying the person who carried out the tampering, the time at which the tampering occurred, and the content that was modified or deleted. Some or all of the results of the investigation can be conveyed to at least one of: the user 305, the administrator 330 (when the administrator 330 is not the perpetrator of the tampering), and a supervisor of the administrator 330 (when the administrator 330 is the perpetrator of the tampering).

The auditor module 325 can carry out the audit operation (Action 12) not only in response to Action 9 where the user requests details about one or more access events carried out at the management server 265, but in various other modes of operation as well. In one example mode of operation, the auditor module 325 executes the audit operation on a predefined schedule such as on an hourly basis, a daily basis, or a weekly basis. In another example mode of operation, the auditor module 325 executes the audit operation on a random basis or on as-needed basis. In yet another example mode of operation, the auditor module 325 executes the audit operation whenever data is transferred from the management server 265 to the verification server 303 or when data is placed in the database 315.

Figure 4:
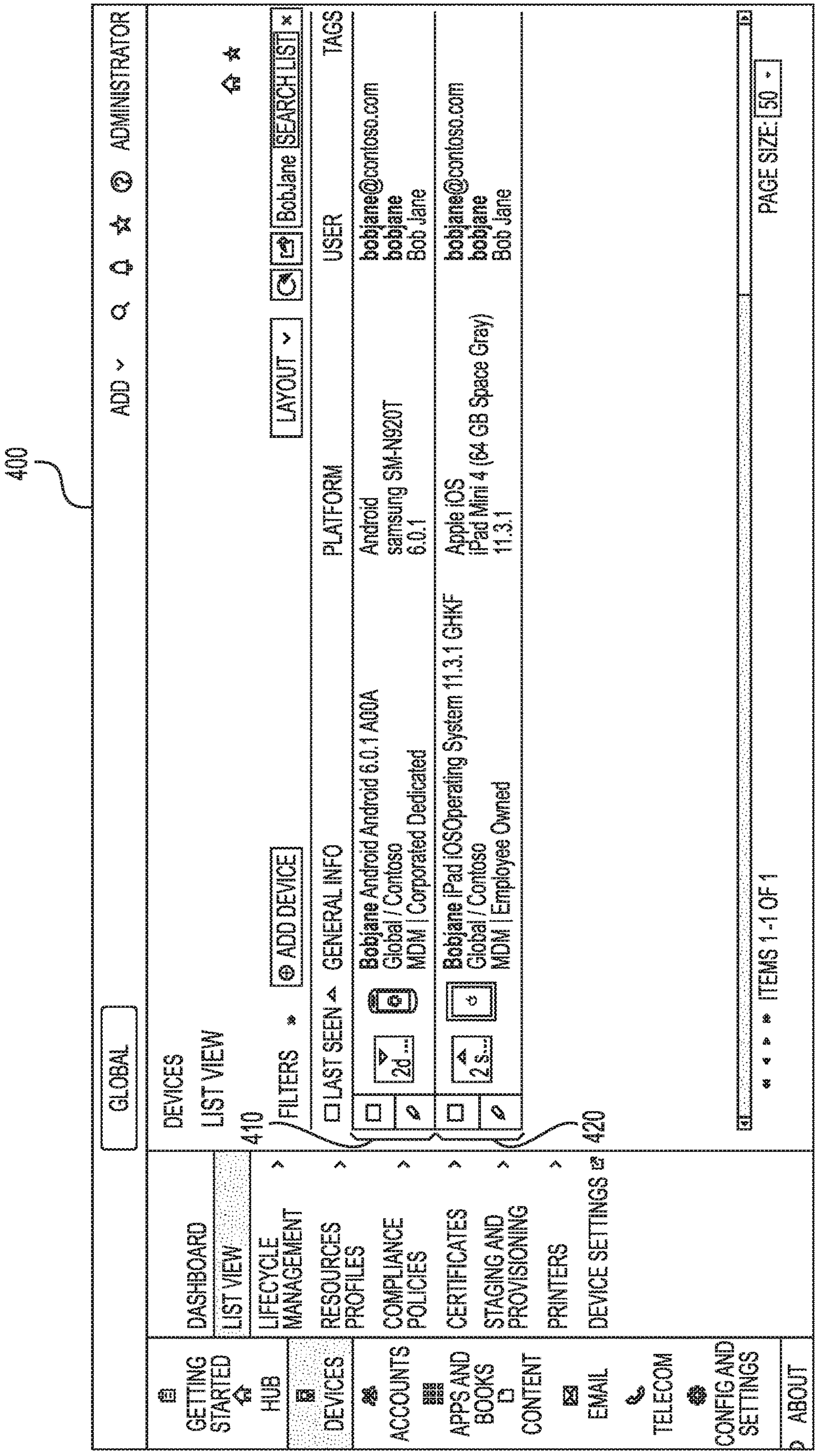
FIG. 4 is an illustration of an example graphical user interface ("GUI") displayed on the console.

FIG. 4 is an illustration of an example GUI 400 of a user interface on the console 260 used by the administrator 330. The user interface can be provided in various formats such as in the form of a web page of a browser and can provide access to information stored at the management server 265. The GUI 400 includes a dashboard that the administrator 330 uses to select a "List View" of various devices that belong to a user who is identifiable in this example as "Bobjane." In this example, the administrator 330 is merely viewing a list of the devices assigned to Bobjane. The list view on the GUI 400 shows two devices assigned to Bobjane. For each device, the administrator can view whether the device is corporate-owned or employee-owned, the operating system type and version of each device, a device identifier, and a username and email address. In this example, the information displayed on the GUI 400 has not been identified as private. Therefore, causing this list view to be displayed does not implicate any hooks that would trigger detection of an event implicating the user's private data.

Figure 5:
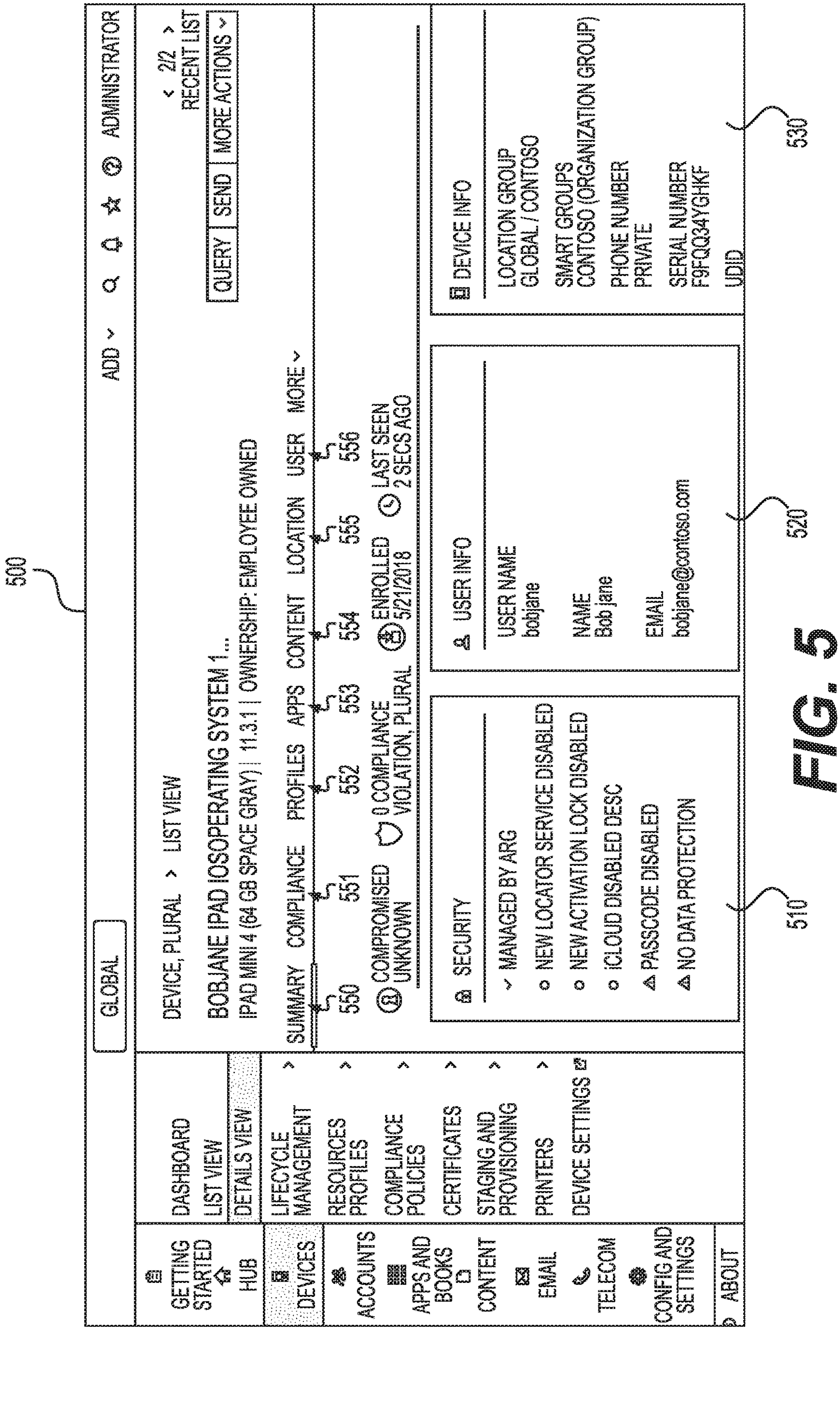
FIG. 5 is an illustration of an example GUI displayed on the console.

FIG. 5 is an illustration of an example GUI 500 of the user interface on the console 260 used by the administrator 330. GUI 500 is generated when the administrator 330 selects a device from the "List View" of FIG. 4. In this example, the administrator 330 has selected Bobjane's employee-owned device. The detailed view can, by default, show a summary tab 550 associated with the device. The summary tab 550 can include information boxes 510, 520, and 530 relating to device security, user information, and device information, respectively. In this example, the GUI 500 still does not show any private information. Bobjane's phone number, for example, is displayed as "Private" in the device information box 530. Because no private information is shown in the summary tab 550, viewing the summary tab 550 in this example does not trigger any hooks that would lead to a detection of private-data access by an administrator 330. GUI 500 also includes tabs for compliance 551, profiles 552, apps 553, content 554, location 555, and user 556, each of which may or may not include detection hooks.

Figure 6:
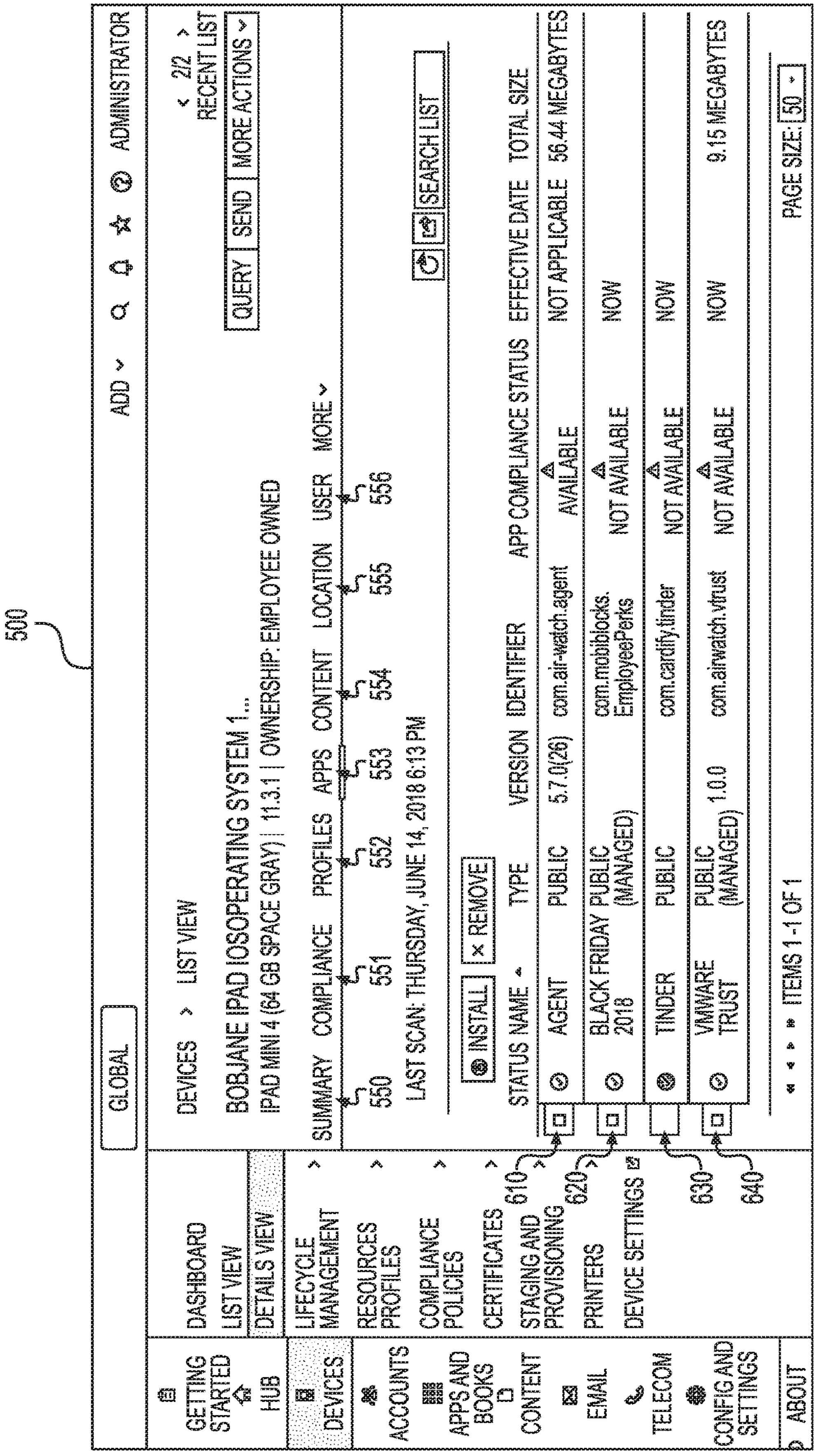
FIG. 6 is an illustration of an example GUI displayed on the console.

FIG. 6 is an illustration of the example GUI 500 after an administrator 330 has selected the apps tab 553. As shown, the apps tab 553 can show a listing of various applications 610, 620, 630, 640 installed on the device. In this example, the listing of applications includes a dating application 630 that is unrelated to the corporate management of the device, the installation of which is likely considered private to Bobjane. Because the device is employee-owned, in this example the apps tab 553 can include a hook. When the administrator 330 selects the tab 553, a hook associated with the tab 553 triggers a detection that the administrator 330 has viewed private data of the user. This can occur regardless of the particular applications installed on the device. Additionally, one or more hooks can be associated with unmanaged applications installed on the device. If the administrator removes an unmanaged application, that removal can trigger a hook. This can be true regardless of whether the device is corporate-owned or employee-owned. While hooks can be placed such that removal of an unmanaged application triggers the hook, in some examples a whitelist can be provided for malicious applications that, even if they are removed by an administrator, do not implicate privacy concerns for the user.

FIG. 7 is an illustration of the example GUI 500 after the administrator 330 has selected the user tab 556. The user tab 556 in this example includes a potential photo 710 of the user, non-private user information 720, and private user information 730. In this example, the private user information 730 is Bobjane's phone number. Because the user tab 556 includes private user information 730, the user tab 556 can include a hook. When the administrator 330 selects the tab 556, a hook associated with the tab 556 triggers a detection that the administrator has viewed private data of the user.

Figure 8:
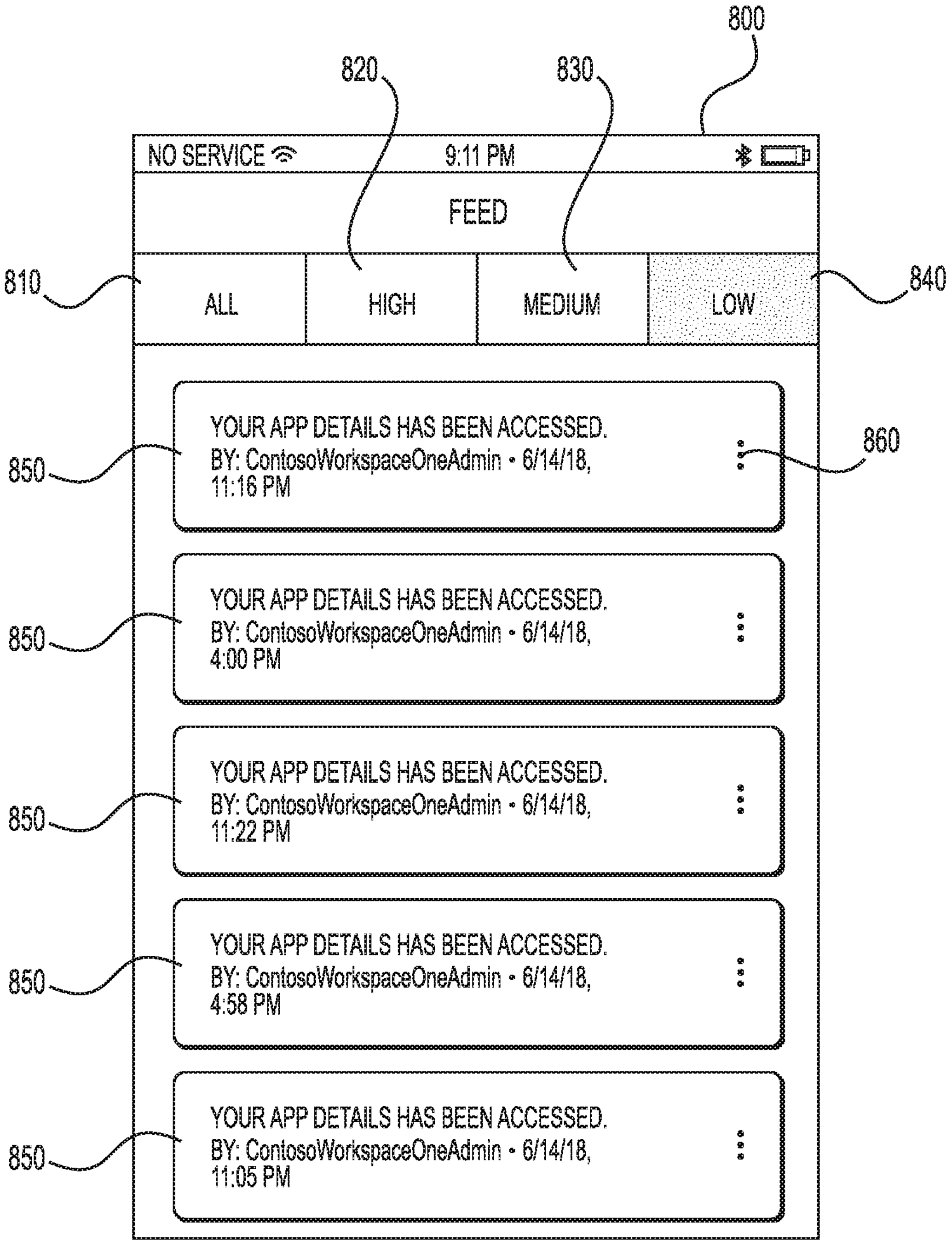
FIG. 8 is an illustration of an example GUI displayed on a user device.

FIG. 8 is an illustration of an example GUI 800 displayed by the privacy application 306 executing on the user device 275. The GUI 800 can include a feed that shows particular instances of access of the user's 305 private data. The feed can be filtered by selecting tabs labeled All 810, High 820, Medium 830, and Low 840, each of which corresponds to all access events, high-priority access events, medium-priority access events, and low-priority access events, respectively. In this example, the Low 840 filter has been selected such that only low-priority access events 580 are shown. These events 850 include instances where the users "App Details" have been accessed. The events 850 can correspond to, for example, the administrator 330 selecting the apps tab 553 in the GUI 500 of FIGS. 5-7. Each event 850 includes details including a username of the administrator 330 that accessed the data, as well as a date and time of access.

An additional graphical element 860 is provided for the user 305 to perform additional actions. Selecting element 860 can provide various options for the user 305. For example, it can provide an option for requesting a reason for access, an option for lowering or raising the importance level of that privacy type, and an option to email the administrator 330 or otherwise report the access. In some examples, accessing a photo or a personal phone number is considered a medium-priority event, which accessing a social security number is a high-priority event. The GUI 800 can display colors corresponding to the priority level of the event, such as red for high-priority, yellow for medium-priority, and green for low-priority.

The GUI 800 can allow the user to send a feedback message from the user device to the management server. The feedback message can be generated based on a user selection condoning or disapproving of the private access. For example, element 860 can allow the use to flag particular data access as objectionable.

In response, the management server can receive the feedback message. A process at the management server can aggregate the feedback message with other feedback messages received from other user devices to recommend whether to change a data access policy related to the private data. This recommendation can be sent to an administrator so that the administrator knows when multiple users are complaining about a particular type of data access. This can allow the administrator to consider reconfiguring which types of data are accessible by an EMM system in some examples.

Figure 9:
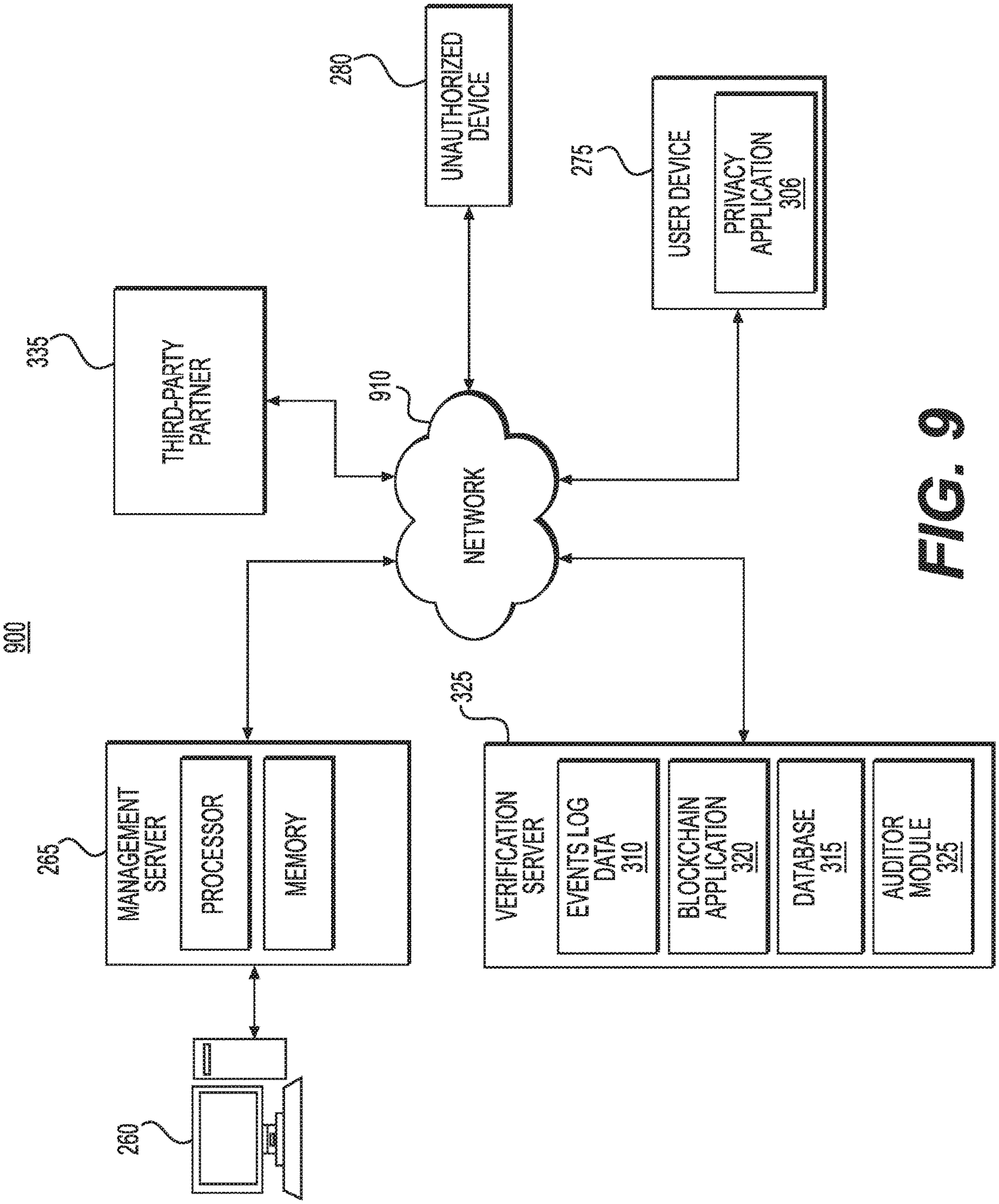
FIG. 9 is an illustration of an example system configured to carry out exemplary methods provided herein.

FIG. 9 is an illustration of an example system 900 configured to carry out exemplary methods provided herein. The system 900 can include the management server 265, the console 260, the user device 275, the verification server 325, and a device belonging to the third-party partner 335. The management server 265 can be a single server or a network of servers and can utilize one or more processors and memory. It can also store information regarding users and user devices 275 enrolled into the enterprise system, user profiles, compliance rules, and authorizations for particular users, devices, and applications. This information can be stored at the management server 265 or at a storage device (not shown) accessible to the management server 265. An enterprise administrator with adequate credentials can access information stored in, or accessible to, the management server. The administrator can access that information through the console 260 that is in communication with the management server 265. The console 260 can be a standalone computing device, or a GUI displayed on a computing device. For example, the console 260 can be a web portal. The user device 275 can further include an operating system for operating the privacy application 306.

The verification server 325 can include event log data 310, the blockchain application 320, the database 315, and the auditor module 325 for executing the various operations described above. The verification server 325, the management server 265, and the user device 275 can communicate with each other through a network 910. The network 910 can be any of various types of networks such as a local area network or a wide area network (the Internet, for example). The unauthorized device 280 can also access some or all of the other devices that are coupled to the network 910. In one example operation, the unauthorized device 280 can access the management server 265 with malicious intent.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for providing privacy information to a user of a user device, comprising:

identifying data as private data of the user;

detecting, at a management server, access of the private data by an entity other than the user and the user device;

generating, at the management server, an event file reflecting the access of the private data;

storing the event file as part of an event log in a database accessible to the management server;

causing the user device to display a graphical element summarizing the detected access;

providing the event file to the user device for display to the user;

receiving a feedback message from the user device, the feedback message being generated based on a user selection condoning or disapproving of the private access; and aggregating the feedback message with other feedback messages received from other user devices to recommend whether to change a data access policy related to the private data, wherein the recommendation is sent to an administrator.

2. The method of claim 1, wherein the event file identifies the accessing entity, the private data accessed, and when the access occurred.

3. The method of claim 1, further comprising storing the event log as a hash in a blockchain.

4. The method of claim 3, further comprising performing an audit by comparing the event log to the blockchain, and taking a remedial action when a difference exists between event files in the blockchain and the event log.

5. The method of claim 4, wherein the event file indicates whose private data was accessed, wherein the database associates a blockchain element with the event file, and wherein the audit includes comparing the blockchain element to the event file.

6. The method of claim 1, further comprising receiving, at the management server, a second event file from a management agent on the user device, the second event file indicating access of private data on the user device by a third-party service other than the management server.

7. The method of claim 1, wherein the entity other than the user and the user device is not previously authorized to access the private data.

8. A non-transitory, computer-readable medium comprising instructions that, when executed by a processor of a management server, cause the management server to perform stages for providing an event log to a user of a user device, the stages comprising:

identifying data as private data of the user;

detecting, at a management server, access of the private data by an entity other than the user and the user device;

generating, at the management server, an event file reflecting the access of the private data;

storing the event file as part of an event log in a database accessible to the management server;

causing the user device to display a graphical element summarizing the detected access;

providing the event file to the user device for display to the user;

receiving a feedback message from the user device, the feedback message being generated based on a user selection condoning or disapproving of the private access; and aggregating the feedback message with other feedback messages received from other user devices to recommend whether to change a data access policy related to the private data, wherein the recommendation is sent to an administrator.

9. The non-transitory, computer-readable medium of claim 8, wherein the event file identifies the accessing entity, the private data accessed, and when the access occurred.

10. The non-transitory, computer-readable medium of claim 8, the stages further comprising storing the event log as a hash in a blockchain.

11. The non-transitory, computer-readable medium of claim 10, the stages further comprising performing an audit by comparing the event log to the blockchain, and taking a remedial action when a difference exists between event files in the blockchain and the event log.

12. The non-transitory, computer-readable medium of claim 11, wherein the event file indicates whose private data was accessed, wherein the database associates a blockchain element with the event file, and wherein the audit includes comparing the blockchain element to the event file.

13. The non-transitory, computer-readable medium of claim 8, the stages further comprising receiving, at the management server, a second event file from a management agent on the user device, the second event file indicating access of private data on the user device by a third-party service other than the management server.

14. The non-transitory, computer-readable medium of claim 8, wherein the entity other than the user and the user device is not previously authorized to access the private data.

15. A system for providing an event log to a user of a user device, comprising:

a memory storage including a non-transitory, computer-readable medium comprising instructions; and a processor that executes the instructions to carry out stages comprising:

identifying data as private data of the user;

detecting, at a management server, access of the private data by an entity other than the user and the user device;

generating, at the management server, an event file reflecting the access of the private data;

storing the event file as part of an event log in a database accessible to the management server;

causing the user device to display a graphical element summarizing the detected access;

providing the event file to the user device for display to the user;

receiving a feedback message from the user device, the feedback message being generated based on a user selection condoning or disapproving of the private access; and aggregating the feedback message with other feedback messages received from other user devices to recommend whether to change a data access policy related to the private data, wherein the recommendation is sent to an administrator.

16. The system of claim 15, wherein the event file identifies the accessing entity, the private data accessed, and when the access occurred.

17. The system of claim 15, the stages further comprising storing the event log as a hash in a blockchain.

18. The system of claim 17, the stages further comprising performing an audit by comparing the event log to the blockchain, and taking a remedial action when a difference exists between event files in the blockchain and the event log.

19. The system of claim 18, wherein the event file indicates whose private data was accessed, wherein the database associates a blockchain element with the event file, and wherein the audit includes comparing the blockchain element to the event file.

20. The system of claim 15, wherein the entity other than the user and the user device is not previously authorized to access the private data.

* * * * *